United States Patent [19]
Taylor

[11] 3,861,735
[45] Jan. 21, 1975

[54] READILY ATTACHABLE ACCESSORY FINS FOR AUTOMOBILE BODIES

[76] Inventor: Don A. Taylor, Box No. 4, Wadsworth, Ohio 44281

[22] Filed: Mar. 22, 1973

[21] Appl. No.: 343,647

[52] U.S. Cl. ............................................. 296/1 S
[51] Int. Cl. ............................................. B60j 1/20
[58] Field of Search .................... 296/1 S, 1 R, 1 C; 280/150 R; 293/DIG. 6, 1; D12/172, 190

[56] References Cited
UNITED STATES PATENTS
2,856,228  10/1958  Adell ................................ D12/190
2,877,046  3/1959  Funk ................................. 296/1 S Primary Examiner—Stanley H. Tollberg
Attorney, Agent, or Firm—John Harrow Leonard

[57] ABSTRACT

Accessory decorative fins for automobile bodies are formed separate and apart from the bodies and fenders. They are shaped so that they can rest on portions of the body, whether body deck or fender, and extend longitudinally thereof with their bases in close fitting relation to the body or fender surface on which they rest, the joint therebetween being weather-sealed. Each fin has an integral flange portion at its base. The flange portion is received between the lateral edge of the front or rear compartment cover, as the case may be, and the adjacent side wall of the entrance opening into the compartment; which wall is usually at, or close to, the inboard side of the adjacent fender. The flange may be secured in position by securing it in firm face to face relation to the opening side wall by screws, welding, or cement. The fin may be additionally, or entirely, secured in place by cementing its base to the surface of the body deck or fender, despite the finish coating of the surface thereof. The fin also can be detachably mounted on the cover. Reflectors or lamps may be mounted on the rear of such a fin. The fin can be detached and removed, if desired, without marring the deck, fender, or cover.

13 Claims, 8 Drawing Figures

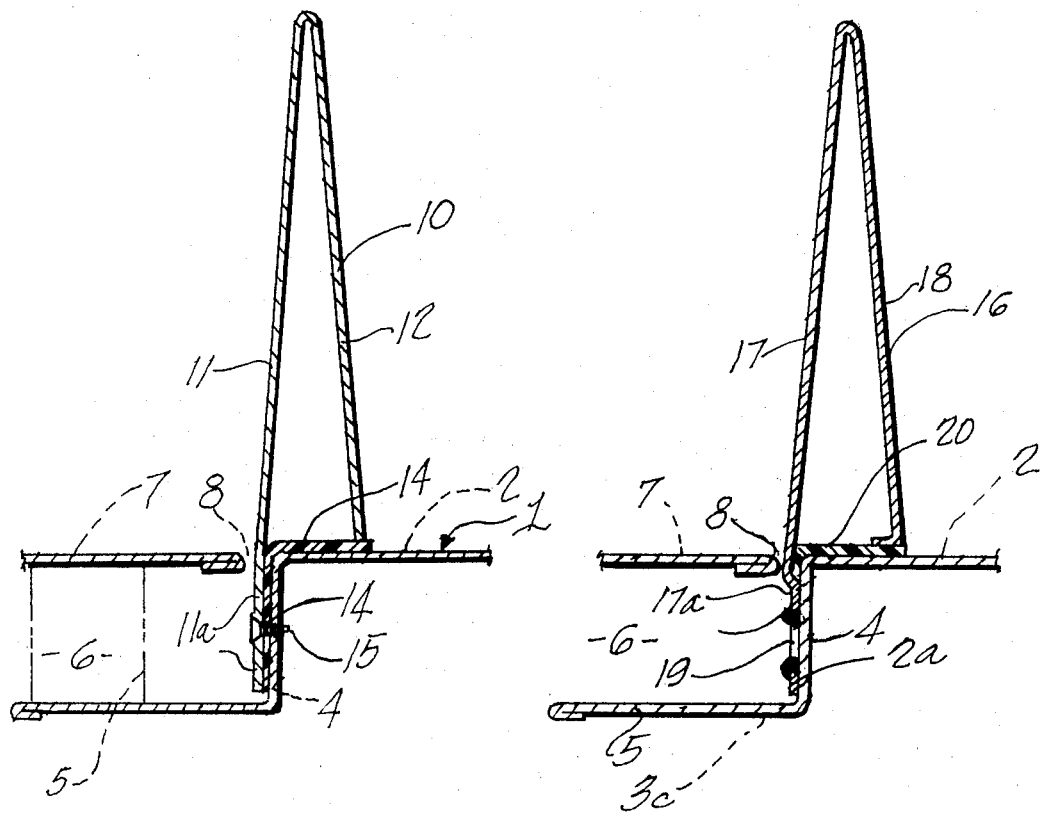
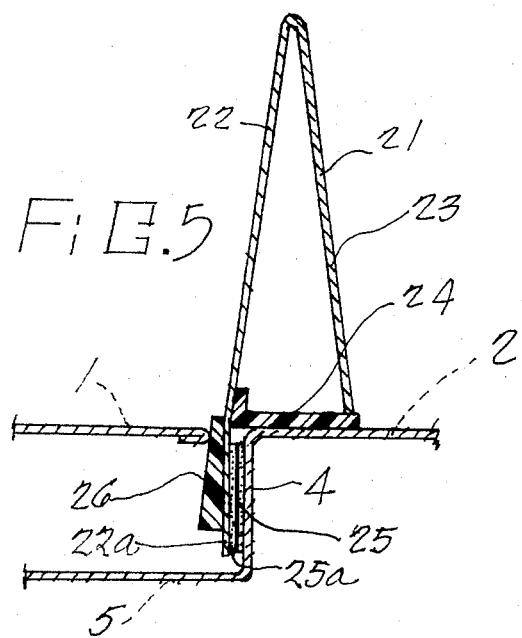
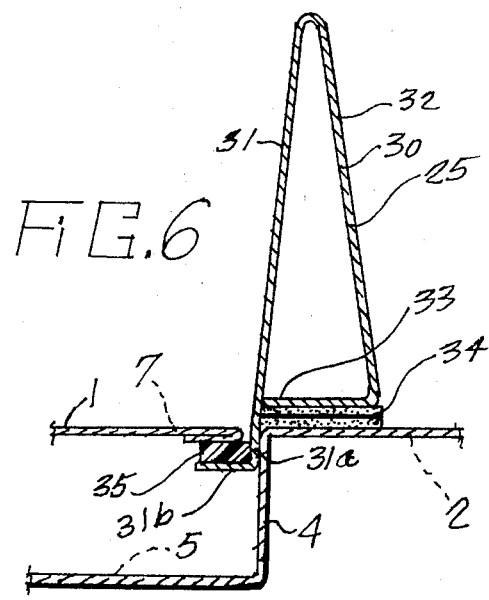

READILY ATTACHABLE ACCESSORY FINS FOR AUTOMOBILE BODIES

BACKGROUND OF INVENTION

1. Field of Invention

Accessory decorative fins for automobile bodies.

2. Description of the Prior Art

For a number of years automobile bodies have been provided with decorative fins which are arranged on the automobile fenders, or on the body deck closely adjacent thereto, and which extend lengthwise of the body. The aesthetic appeal of such fins has been proven by demand. Such fins are said to have aerodynamic value in providing better flow of air, and reduction of swirling of air passing along the automobile body, and of air drag.

Fins as a distinct feature of automobile bodies had led to their provision on most luxury cars for several years, despite the extra cost thereof. Heretofore, these fins have been formed as an integral stamped part of the fender or body deck, a factor which adds considerably to the original die, material, and manufacturing cost of the body. Further, the fin design must be agreed upon and the design "frozen" preparatory to ordering dies for the fenders or body a long period before the new model is made available to the public. However, the automobile manufacturers have accepted the incorporation of fins as a competitive necessity despite the gamble as to how appealing the particular type of fin will prove when it has been embodied in the actual body or fender structure. These factors limit the types and styles of bodies and fins made available to the public by the automobile manufacturers.

SUMMARY OF THE INVENTION

In accordance with the present invention, the automobile body is manufactured by conventional procedures, but without fins, and separately formed attachable fins are provided as accessory equipment which can be attached to the fenders or body deck after the automobile is on the sales floor and otherwise ready for the market. The accessory fins can be attached readily without requiring any substantial change in the automobile body and without marring in any way the original paint or surface finish on the exposed part of the body. As a result, the material and die costs for bodies and fenders are reduced materially, since the deep draw metal required for integral fins is unnecessary. Furthermore, since the fins are separately formed, a much wider range of fin styles can be provided and readily attached to the body to meet the desires of the customer as to aesthetics or air flow. This can result in a reduction of basic body designs necessary for meeting customer demands.

The fins are such that they can be installed readily by the service departments of automobile dealers, by garagemen, or by the automobile owner himself.

Such accessory fins can be manufactured and stocked for sale at the automobile dealers or retail outlets with only a priming paint coat, and painted to match the finish of the automobile bodies on which they are to be installed with the present easily matched body paints, or with such color schemes as meet the customer's own particular desires. Since they can be installed readily with the color scheme optional, they have a large sales potential in the used car market and in the market for the lower priced automobiles on which no fins are provided.

The fins are such that when installed, they provide a rear end surface disposed at a higher level than the deck or fenders, and conventional tail lights or reflectors can be mounted thereon with lenses at a higher elevation than before, and thereby increase their visibility to drivers of other automobiles. The fins can readily be formed of sheet steel or sheet aluminum, plastic and the like. If desired, they may be reinforced. They may be installed on the body by mechanical means or by some of the special cements readily available on the market, such, for example, as those now used to cement bead trim on automobile bodies.

Various specific objects and advantages will become apparent from the following description wherein reference is made to the drawings.

BRIEF DESCRIPTION OF THE DRAWING

FIG. 3 is a further enlarged vertical cross sectional view of a portion of the body and a fin of the present invention installed thereon;

FIG. 4 is a view similar to FIG. 3 showing a modified connection of a fin to the body;

FIG. 5 is a view similar to FIG. 3, showing a second modification of the connection of a fin to the body;

FIG. 6 is a view similar to FIG. 3 showing a modified fin and its connection to a body deck;

Figure 1:
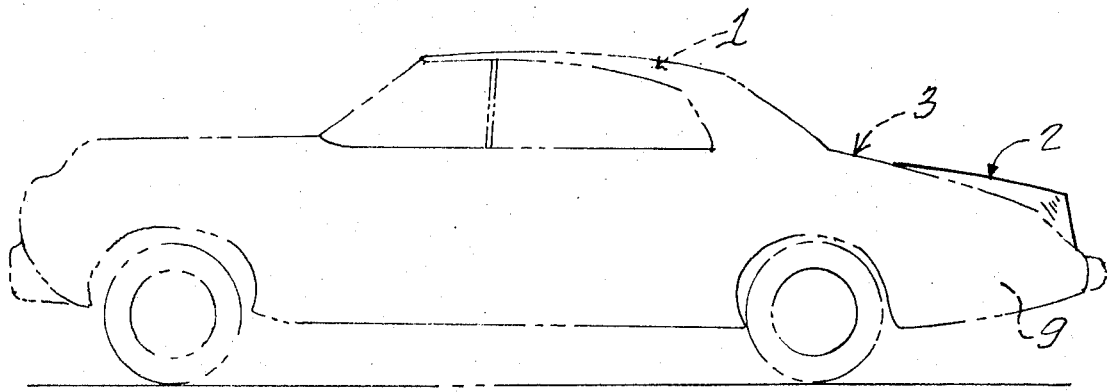
FIG. 1 is a diagrammatic side elevation of an automobile showing a fin of the present invention installed thereon.

Referring to the drawing, the fin is shown for purposes of illustration as a rear fin installed on the deck of an automobile body adjacent to, and outwardly from the lateral outer limit of the rear trunk or baggage compartment, it being apparent that like fins can be installed in a similar manner at the outboard lateral limits of the front or engine compartment.

Figure 2:
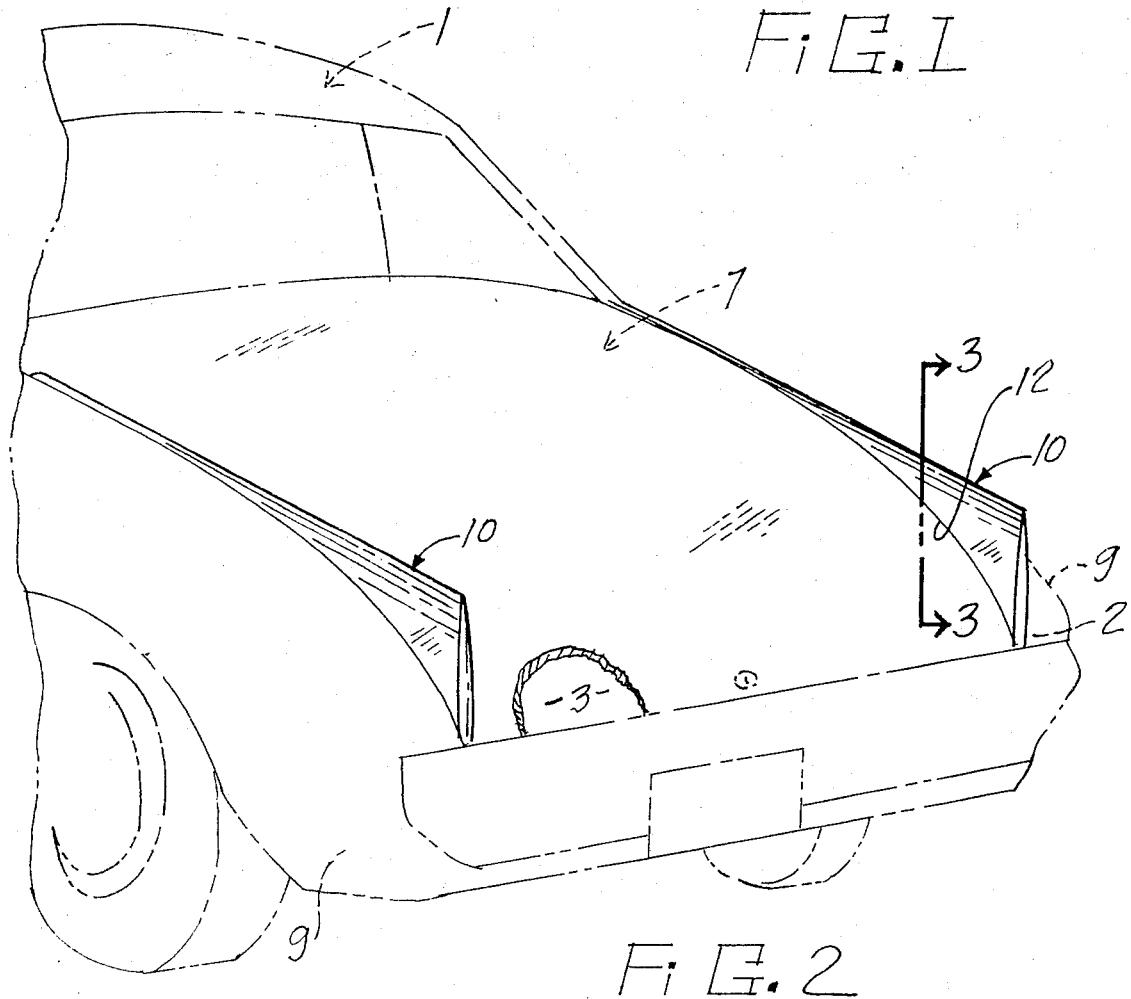
FIG. 2 is an enlarged, fragmentary, diagrammatic view of the rear portion of an automobile showing fins of the present invention installed on the body deck alongside the rear fenders.

Referring first to FIGS. 1 through 3, there is shown an automobile A, having a conventional body 1 with a rear deck 2 in which is provided a conventional open top baggage or trunk compartment 3. The open top of the compartment 3 is defined generally by upright outboard side walls 4 and inwardly extending, nearly horizontal, marginal walls 5. Usually the walls 4 and 5 are integral with the adjacent portion of the rear deck 2, as illustrated, and provide and define an opening 6 which is closed by a rear compartment cover 7. The cover 7 is received in the opening 6 to a depth such that its upper surface is generally flush with the upper surface of the deck 2. The cover 7 is substantially coextensive with the opening 6, its lateral margins being in overhanging vertically spaced relation to the walls 5. The lateral edges of the cover 7 fit the sides of the opening 6 with substantial clearance, as indicated at 8. The cover has the usual inside reinforcing panel, not shown.

The conventional elastomeric weatherseal, not shown, may be provided between the margin of the inside reinforcing panel of the cover 7 and the marginal flange wall 5. The body has rear fenders 9. Generally a rear fin extends lengthwise of the rear fender, or of the body at or adjacent the rear fender from the rear of the fender to or beyond the front end thereof.

The structure thus described is conventional in automobile bodies and, except in combination with the present fin, forms no part of the invention.

A fin embodying the principles of the present invention is indicated at 10 in FIGS. 1 through 3. The fin 10 comprises a sheet of material, preferably metal, such as steel or aluminum, formed generally into a triangular, or an inverted V-shape, cross section, to provide an inboard wall 11 and an outboard wall 12. The walls 11 and 12 are integrally joined at the top of the fin and diverge downwardly to the base of the fin. Along its lower edge the wall 12 is contoured to fit the forward and rearward contour of the body deck on which the fin is superposed. The inboard wall 11 has an integral lower basal flange portion 11a which extends downwardly beyond the base of the exposed fin 10 as a whole, and below the level of the lower edge of the wall 12. The flange portion 11a is arranged to lie closely alongside the inboard face of the side wall 4 and to extend downwardly to, or almost to, the bottom of the wall 4, close to the wall 5.

It is desirable that a weatherseal be provided between the bottom of the fin 10, including the bottom edge of the outboard wall 12, and extend entirely across the bottom of the fin and alongside the outboard face of the flange portion 11a. As illustrated in FIG. 3, an elastomeric sealing strip 14 is provided for this purpose. The sealing strip 14 is clamped firmly between the lower edge of the wall 12 and the deck 2, and between the flange portion 11a and wall 4. In this form, the fin is shown as installed by providing a series of perforations along the length of the portion 11a and which receives screws 15 of the self-cutting thread type, as illustrated. The installation of the fin is relatively simple. It is merely pressed down firmly against the top of the deck 2 adjacent the opening 6 with the flange portion 11a juxtaposed firmly against the wall 4. With the fin as a pattern, spots aligned with holes in the flange portion 11a are marked onto the wall 4. Small perforations are then drilled or pierced to provide small starting holes for the screws 15. With the fin 10 in final position and the strip 14 between the portion 11a and wall 4, the self-threading screws are installed.

It is thus seen that no exposed decorated part of the body is marred in any way, and that the installed finslies at, or closely alongside, the inboard side of the rear fender.

A like arrangement is illustrated in FIG. 4 in which the fin 16, comparable to the fin 10, is installed. The fin 16 has an inboard wall 17 and an outboard wall 18. A basal flange portion 17a is provided and has a series of performations 19 therein, spaced along the length thereof, so that the flange can readily be spot welded to the wall 4 defining the opening into the rear compartment. An elastomeric sealing strip 20 is disposed between the base of the flange 16 and the upper face of the deck 2.

As mentioned, other elastomeric sealing strips, not shown, are provided between the inside panel of the cover 7 and the wall 5. If additional sealing at the edge of the cover 7 is desired, the structure illustrated in FIG. 5 may be employed. Therein a fin 21, corresponding to the fin 10, is illustrated, and has an inboard wall 22 with a basal flange portion 22a, and an outboard wall 23. A sealing strip 24 is disposed between the bottom of the fin 21 and the top of the portion of the rear deck 2 on which the fin rests, and is cemented to the fin 21 and to the painted deck 2. Instead of the basal flange portion 22a being secured to the wall 4 by means of screws, welding, rivets, and the like, the portion 22a is secured to the wall 4 by cement which preferably is of the type now used in automobile body manufacture for securing bead trim to the painted automobile body surface. If desired, this cement or other adhesive material may be of the pressure sensitive type, including a core strip 25 of fabric or the like with layers 25a of adhesive on its opposite faces, respectively. In addition, if desired, a weatherproofing strip 26 of elastomeric material may be adhesively secured to the inboard face of the basal flange portion 22a and engage the adjacent edge of the cover 7. The strip 26 suppresses or eliminates noises due to vibration of the cover 7, as well as weatherproofs. Since it is tapered from bottom toward the top, it wedges firmly against the edge of the cover and hence against the basal flange portion 22a. Thus the closed cover 7 assists in resisting lateral shocks imposed on the fin.

In FIG. 6, a fin 30 is provided and has an inboard wall 31 with a basal flange portion 31a, corresponding generally to the wall 11 and its flange portion 11a, and with an outboard wall 32. However, in this form, the fin 30 is provided with a bottom wall 33 in the form of an inturned margin at the lower edge of the outboard wall 32. The wall 33 extends entirely to the inboard wall 31 and may be welded or otherwise secured thereto. The wall 33 is secured to the upper face of the deck 2 by means of adhesive strip material 34 of the type heretofore described. The basal flange portion 31a has an inturned horizontal flange portion 31b on which is disposed a weather sealing strip 35 of elastomeric material which engages and forms a seal with the under face of the lateral margin of the cover 7, as illustrated.

Figure 7:
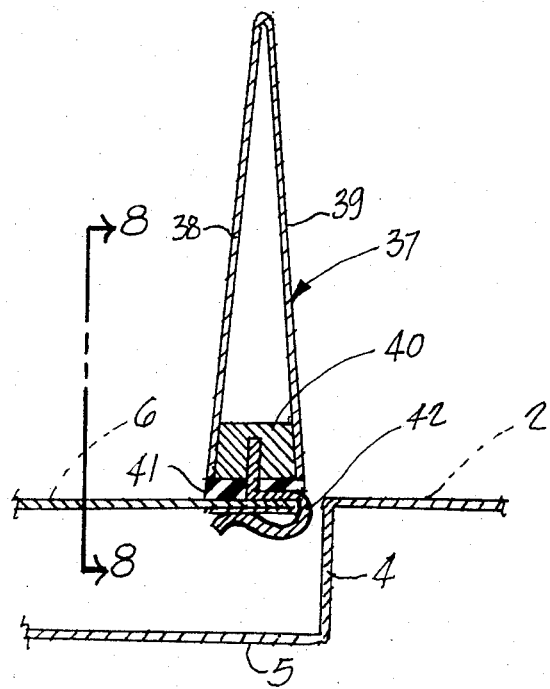
FIG. 7 is a view similar to FIG. 3 showing a fin of the present invention connected to the compartment lid of an automobile body.
Figure 8:
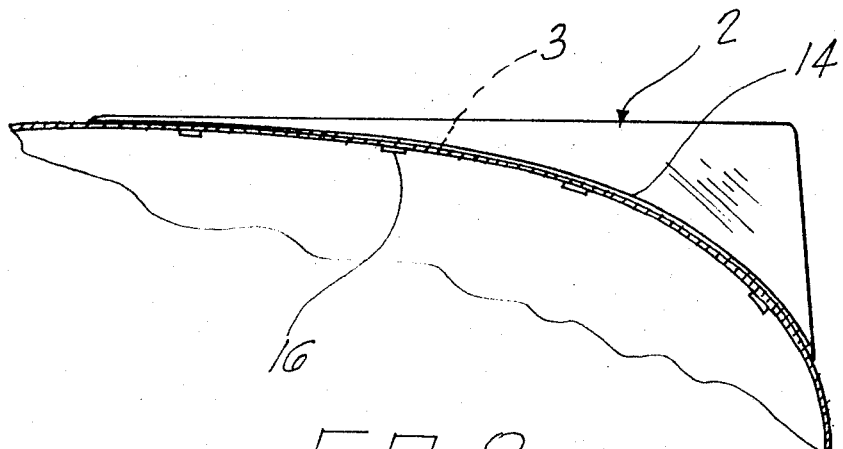
FIG. 8 is a vertical cross sectional view, on a reduced scale, of a fin and portion of an automobile body, illustrated in FIG. 7, and is taken on the line 8—8 of FIG. 7.

In some instances, the weather strip seals used may themselves be in the form of adhesive strip material, or adhesive material may be provided on opposite faces of the elastomeric sealing strip. In FIG. 7 a fin 37 is illustrated. The fin 37 is a single piece of metal bent to inverted V-shape to provide an inboard wall 38 and an outboard wall 39. At the bottom of the fin, the lower margins of the walls are first secured to a suitable metal or composition closure plug or base member 40. The member 40 is fixedly bonded by adhesive or otherwise to the inner faces of the bottom margins of the walls 38 and 39. The member 40 terminates at the lower edges of the walls 38 and 39, and a weather sealing strip 41 is secured to the bottom of the member 40 and lower edges of the walls 38 and 39, so as to extend entirely across the bottom of the fin 37. The fin 37 may be secured directly to the cover 7 or deck 2 by means of suitable cement, but in the form shown, it is secured detachably by suitable clamps 43 which are distributed lengthwise of the bottom of the strip 41 and secured in place by being bonded to the strip or by being secured to the member 40. The clips 43 have sufficient spring tension so that they can grip firmly against the under face of the margin of the cover 7 and hold the bottom of the fin with its elastomeric seal 41 in firm sealing juxtaposition with the top surface of the cover 7. In FIG. 7, the elastomeric strip or pad 41 protects the surface of the cover so that, should one desire to remove the fins, the original appearance and finish of the cover 7 remains unmarred.

In all cases in which an elastomeric strip is used without any cement, the original body finish is unmarred. The elastomeric strip also reduces vibration and eliminates possible noises resulting therefrom.

It is apparent, therefore, that the fin of the present invention is one that can be manufactured economically as an accessory item separate and apart from the body and its fenders, and can be attached readily to the body structure even after the body has been painted or coated with its final decorative finish coat, all without requiring any operations which can mar the outer exposed decorative body surface. The specific cross sectional shape of the fins and the longitudinal profiles of the bases are predetermined with respect to the particular bodies and fenders. The fins are relatively inexpensive and can be formed with simple dies. They can be made in a much wider variety of shapes and styles than would be economically possible were they incorporated as an integral part of the fender or deck structure. They can be installed readily by the manufacturer, the dealer, or the car owner. Only a small inventory of fins need be kept on hand at the service or retail outlets, and these require only a priming coat because the finish coat to match the body or in accordance with customer desires can be applied at the time of installation. Matching of paints on automobile bodies is an art developed to the point where the car owner can readily obtain the proper matching paint and apply it himself. The fins, therefore, can be replaced readily, if damaged, and provided with colors in a range from which the aesthetic predilections of most people can be met.

In most forms of the invention, the attaching means permit the installation of the fins by utilizing the space between the lateral edge of the compartment cover and the side wall 4 defining the opening 6 into the compartment.

Having thus described my invention, I claim:

1. The combination with a known automobile body structure including a deck, fenders, at opposite sides of the deck in lateral alignment with each other, a compartment with an open top opening through the deck between the fenders, and a hinged cover for the open top of the compartment;
    said body structure having lateral framing portions defining the lateral limits of an opening into the compartment at its top, and each lateral framing portion having at its outboard side a generally upright side wall;
    attachable fins separate from the body structure and mounted on the top of the body structure adjacent to said upright side walls, respectively, each fin in a position in which it extends generally endwise of a fender and in which its bottom overlies the top surface of said body structure adjacent said associated upright wall; and
    holding means at the base of each fin juxtaposed against the body and secured in fixed relation thereto and to the associated fin and securing the associated fin fixedly in said position on the body.

2. The structure according to claim 1 wherein the holding means includes cementitious material.

3. The structure according to claim 1 wherein the holding means of each fin includes a longitudinal flange at the base of the fin and juxtaposed against and secured to the adjacent one of said upright side walls.

4. The structure according to claim 3 wherein each flange is fixedly secured to its adjacent upright side wall and, at its bottom, is securely fastened in overlying relation to the top wall of the body structure adjacent said side wall; and
    weatherproofing material is juxtaposed between the bottom of the fin and the top of the body structure adjacent said upright wall.

5. The structure according to claim 4 wherein the bottom of the fin is adhesively bonded to said associated part of the top wall of the body.

6. The structure according to claim 3 wherein the flange is secured to said upright wall by adhesive material.

7. The structure according to claim 1 wherein each fin is disposed on top of, and extends along, an associated one of the lateral margins of the cover, and the securing means is carried on the fin at the bottom and is detachably connected to the cover.

8. An attachable fin for a known automobile body structure which includes a deck, fenders at opposite sides of the deck in lateral alignment with each other, an open top compartment opening the top through the deck between said fenders and having lateral framing portions defining the lateral limits of the opening, and a hinged cover for opening and closing the open top of the compartment, said fin comprising:
    an elongated, rigid, fin body having a front end, a rear end, a top portion, a base, and side walls extending from the top portion to the base;
    said base being of substantial width and the bottom of the base being curvilinearly concave downwardly endwise and contoured to fit on, and conform to the contour of, the top portion of a selected style of automobile body adjacent to and alongside a lateral limit of the opening when disposed thereon while extending, lengthwise of the base, endwise of the automobile body;
    a basal attaching flange carried by the hollow body at one lateral edge of the base and extending, in a direction away from the top portion toward the base, beyond the bottom of the base, and adapted to lie alongside said lateral framing portion adjacent to the fin in the installed position of the fin; and
    said fin body being free from any lateral projections which extend outwardly of the base appreciably beyond said one lateral edge of the base above the level of the base.

9. The structure according to claim 8 wherein said basal flange extends in a direction away from the top portion of the fin and toward and past the base of the fin and is a downward continuation of one of said side walls of the fin.

10. The structure according to claim 8 wherein a weather-proofing layer of material is juxtaposed against, and is coextensive with, at least the major portion of the base of the fin.

11. The structure according to claim 8 wherein a layer of weatherproofing material is juxtaposed against and is coextensive endwise with at least a major portion of the length of the outboard face of the basal flange.

12. The fin according to claim 8 characterized in that said fin body is a hollow unitary structure of folded sheet metal.

13. The fin according to claim 12 wherein said top portion and base are convergent relative to each other from rear to front of the fin body, and said side walls of the fin body are divergent from the top portion toward the base, and the basal fin is a continuation of one of the side walls of the fin body.

* * * * *